No. 614,757. Patented Nov. 22, 1898.
A. J. PERKS.
CRANK AND AXLE FOR BICYCLES.
(Application filed July 12, 1897.)
(No Model.)
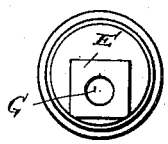
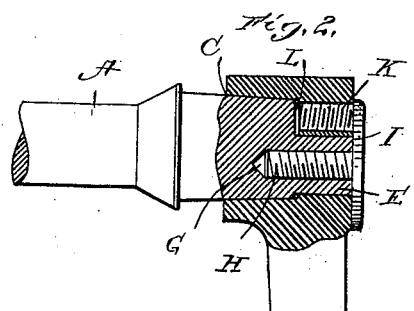
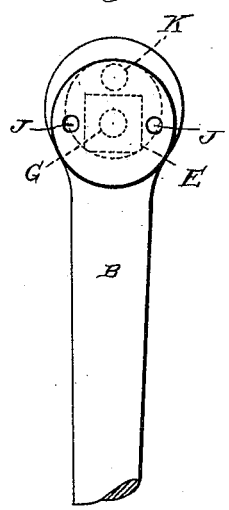
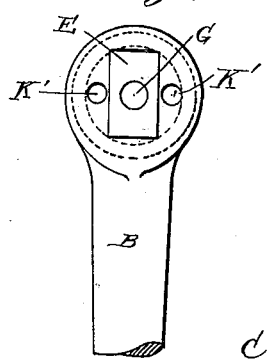
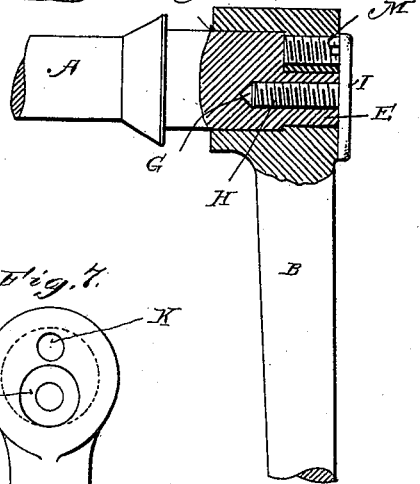
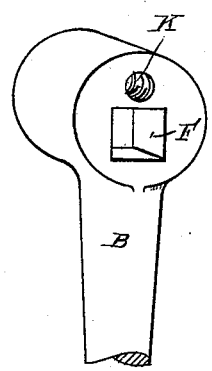
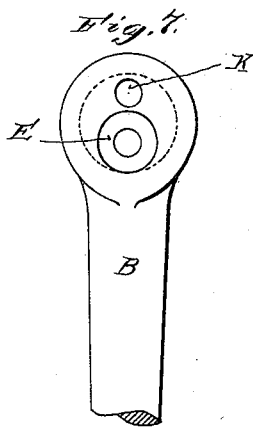
Witnesses
Jas. E. Dawley.
W. M. McNair.
Inventor
Albert J. Perks,
By his Attorney
H. A. Toulmin

UNITED STATES PATENT OFFICE.

ALBERT J. PERKS, OF SPRINGFIELD, OHIO.

CRANK AND AXLE FOR BICYCLES.

SPECIFICATION forming part of Letters Patent No. 614,757, dated November 22, 1898.

Application filed July 12, 1897. Serial No. 644,181. (No model.)

*To all whom it may concern:*

Be it known that I, ALBERT J. PERKS, a citizen of the United States, residing at Springfield, in the county of Clark and State of Ohio, have invented certain new and useful Improvements in Cranks and Axles for Bicycles, &c., of which the following is a specification, reference being had therein to the accompanying drawings.

This invention relates to certain new and useful improvements in cranks and axles for bicycles, tricycles, and other uses.

The general object of my invention is to provide for securely holding the crank on the axle and for easily removing the crank from the axle, so that, no matter how tightly the crank is fitted to the axle or how much it may tend to "stick," still the user of the device will always have it within his power to conveniently and easily remove the crank. This object I carry into practice by means of certain features, of which the primary and essential one is a screw-threaded hole in the axle, a screw adapted to fit the same and to bind against the crank, and a screw-threaded hole in the crank, with a shoulder on the axle in such relation to said latter hole that when a screw is screwed therein the shoulder will resist the screw and cause the latter to back the crank off the axle, the same screw or separate screws being used to hold the crank on and to so remove it.

In the accompanying drawings, on which like reference-letters indicate corresponding parts, Figure 1 is an end view of an axle embodying my invention; Fig. 2, a partial side and longitudinal sectional view of an axle and a crank with a holding-screw; Fig. 3, an end elevation of the parts shown in Fig. 2; Fig. 4, a like end elevation showing a modification in the axle and crank; Fig. 5, a like sectional view to Fig. 2, showing another modification; Fig. 6, a detail perspective view of the crank alone, and Fig. 7 another end elevation showing another modification.

The letter A designates a crank or driving axle of a bicycle, velocipede, or other apparatus, and the letter B a crank for the same, the pedal or foot-piece not being shown. In Fig. 2 the axle and crank are shown with a taper, as seen at C, while in Fig. 5 the same parts are parallel. My invention is applicable to either form; but the tapering form is preferred. Such axle is provided with an extension E, whose outline may be either square, as shown in Figs. 1, 2, and 3, or parallelogrammatic, as shown in Fig. 4, or round, as shown in Fig. 5, or any other desired shape in outline. The position of this extension is preferably eccentric with respect to the center of the axle, as shown in all the figures except the fourth, or it may occupy a concentric position, as shown in Fig. 4. This extension fits a similarly-shaped opening in the crank, as most clearly seen at F in Fig. 6. The angular form of the extension so fitting in the crank will hold the crank from rotating independently of the axle or will make the axle rotate with the crank. The eccentric position of the extension, whatever be its form of outline, will also cause the extension to prevent the crank from turning or will cause the axle to turn with the crank. This eccentric position further causes the rotative strains of the crank to operate with a shear action on the extension, as distinguished from a torsional effect, which would be the action of the crank on a concentric extension; so I prefer the eccentric relation of the extension to the axle, as this shear resistance gives greater strength than a torsional resistance would afford. The axle is further provided with a screw-threaded hole G, into which screws a screw H, with a head I large enough to extend over against the crank and operate to draw the crank tightly onto the axle, as when there is a tapering fit between them, or to hold the crank on the axle, as when there is a parallel fit between them, and the crank has been forced on by other means than the screw itself. Thus the first function of this screw is to force the crank on and hold it on or merely to hold it on. The second function of this screw, as will presently appear, is to force the crank off of the axle. This latter function may, however, be assigned to and be performed by a second screw, as shown in Fig. 5, though I prefer to perform the function of removing the crank by the single screw H. Its head has openings or recesses J for a suitable tool in the nature of a wrench to rotate the screw. Now in order to force the crank off and to overcome the stick of the crank on the axle the crank is provided with a screw-threaded opening K, which leads up to a shoulder L on the axle. I prefer to use only one screw-threaded hole K and have so shown the device, except as to Fig. 4, in which I show two such holes, the same being marked K' and either of which may be used in connection with the single screw H or each of which may be used with an additional screw, such as will presently be referred to. Let it be now supposed that the crank is to be forced off or removed from the axle. The screw H is backed out of the screw-threaded hole G and is then screwed into the hole K in the preferred form, or a separate screw M, already in the hole K, (or hole or holes K',) is used. Then the screw, whichever one it may be, which is in such hole K (or K') is rotated. Such screw will impinge against the shoulder L and start or force the crank from the axle. Thus by means of a screw-threaded hole in the axle, a screw-threaded hole in the crank, and a shoulder on the axle, together with a screw or screws acting first in one hole and then in the other, the crank is forced or held on the axle and is removed or started from the axle. I understand myself to be the first to make a device embodying these features, and accordingly I make broad claim to the same. The additional feature of the extension operating to prevent the crank from rotating is to be understood as an important element, but not as an indispensable one in the successful carrying out of my invention, and so I wish to be further understood accordingly.

Having thus fully described my invention, what I claim as new, and desire to secure by Letters Patent, is—

1. In a crank and axle, the axle having a screw-threaded hole, and a shoulder, and the crank having a screw-threaded hole leading to said shoulder, and a screw which bears against said crank, and when screwed into the axle-hole draws or holds the parts together and when screwed into the crank-hole separates the parts.

2. In a crank and axle, the axle having an eccentric extension, a screw-threaded hole and a shoulder, and the crank having a screw-threaded hole opposite the shoulder, and a screw which when screwed into the axle-hole bears against said crank and draws or holds the parts together and when screwed into the crank-hole separates the parts, the crank having an opening which fits the extension.

In testimony whereof I affix my signature in presence of two witnesses.

ALBERT J. PERKS.

Witnesses:
W. M. McNAIR,
JAS. C. DAWLEY.